(12) United States Patent
Aoki et al.

(10) Patent No.: US 7,096,880 B2
(45) Date of Patent: Aug. 29, 2006

(54) FLOAT TYPE STEAM TRAP

(75) Inventors: Masahiko Aoki, Miyagi (JP); Jiro Sanui, Miyagi (JP)

(73) Assignee: Kabushiki Kaisha Motoyamaseisakusho, Miyagi (JP)

( * ) Notice: Subject to any disclaimer, the term of this patent is extended or adjusted under 35 U.S.C. 154(b) by 44 days.

(21) Appl. No.: 10/616,650

(22) Filed: Jul. 9, 2003

(65) Prior Publication Data

US 2005/0236041 A1    Oct. 27, 2005

(51) Int. Cl.
*F16T 1/24* (2006.01)
(52) U.S. Cl. .................... 137/192; 137/434; 251/368
(58) Field of Classification Search ........... 137/192, 137/434; 251/368
See application file for complete search history.

(56) References Cited

U.S. PATENT DOCUMENTS 2,117,056 A * 5/1938 Dunn ..................... 137/192
4,757,837 A * 7/1988 Provost et al. ............ 137/192

FOREIGN PATENT DOCUMENTS

| JP | 48-4332 | 2/1973 |
| JP | 48-37285 | 11/1973 |
| JP | 49-23925 | 6/1974 |
| JP | 2002-195492 | 7/2002 |

* cited by examiner

*Primary Examiner*—Kevin Lee

(57) ABSTRACT

There is provided a float type steam trap having a casing having a float chamber formed with an inflow port and an outflow port. A holder has a flow path communicating with the outflow port. A valve seat on the holder communicates with the outflow port. A float has a float body and a lever with a valve element. One end of the lever is fixed to the float body, and the other end is supported by the holder. The valve element slides with the up-and-down movement of the float body to open and close the valve seat 5.

12 Claims, 10 Drawing Sheets

(A)

(B)

FLOAT TYPE STEAM TRAP

BACKGROUND OF THE INVENTION

1. Field of the Invention

The present invention relates to a steam trap which is connected to steam-operated equipment or steam tubes to automatically discharge condensate.

2. Description of the Related Art

A conventional float type steam trap is shown in FIGS. 13 and 14. A float type steam trap 50 shown in FIG. 13 is constructed so that a cylindrical inner valve 53 is fixed to a lever 52, one end of which is fixed and the other end of which is supported so as to be turnable, and the inner valve 53 moves up and down following the up-and-down movement of a float 51.

Also, a float type steam trap 60 shown in FIG. 14 is constructed so that a spherical inner valve 63 is fixed to a lower end portion of a lever 62, one end of which is fixed to a float 61 and the other end of which is supported so as to be turnable, and the inner valve 63 is opened and closed along with the turning action of the lever 62.

In the float type steam trap shown in FIGS. 13 and 14, taking the buoyancy of float as F, the distance from the center of float to the turning center position of lever as L1, the distance from the turning center position of lever to the installation position of inner valve as L2, the cross-sectional area of an outflow port as A, and the difference in condensate pressure between the inlet side and the outlet side of outflow port as ΔP, the condition for opening the valve is expressed by the following equation.

$$F \times L1 > A \times \Delta P \times L2 \qquad \text{Equation (1)}$$

In order to open the valve in the conventional float type steam trap, in Eq. (1), F or L1 has only to be increased, or A, ΔP or L2 has only to be decreased. However, an increase in F or L1 presents a problem of increased size of the entire device.

Also, a decrease in A leads to decreased discharging capability, and a decrease in L2 leads to decreased discharging capability of condensate because a sufficient lift of inner valve cannot be provided. Further, a decrease in ΔP restricts the service condition, and hence presents a problem of loss of versatility.

Also, the valve seat system that determines the valve closing performance of the conventional float type steam trap is a surface contact system of up-and-down motion for the type shown in FIG. 13, and a line contact system of spherical surface for the type shown in FIG. 14. Therefore, the closing performance and durability are incomplete, and thus there arises a problem of steam leakage etc.

To solve these problems, in the conventional float type steam trap with high discharging capability, the size of the entire device is large, and the usable ΔP is small. Also, the device in which the size thereof is small and the usable ΔP is large has low discharging capability. Therefore, there is a tendency for increased number of device types and for increased-size of device to meet wide-range specifications.

Thus, the requirements imposed on the float type steam trap are as follows:

1) The entire device, which has conventionally been large in size, is downsized, the discharging capability is increased, and the service pressure range is widened.

2) The closing performance and durability are improved, unnecessary consumption of steam is eliminated, and economical operation is realized.

3) The occurrence of water hammer caused by sudden closure of inner valve is prevented.

4) In a device having high condensate discharging capability, continuous discharge can be effected even when the inflow amount of condensate is small.

5) The float is prevented from moving violently and being damaged due to sudden inflow of condensate or disturbance such as vibrations during transportation of device.

In order to solve the conventional problems as described above, the inventors have developed a float type steam trap having a valve element, which slides with respect to a valve seat in association with the up-and-down movement of float so as to be able to open and close the valve seat, provided on a float (see Japanese Patent Laid-Open No. 2002-195492).

SUMMARY OF THE INVENTION

An object of the present invention is to provide a float type steam trap that can further improve the valve closing performance in a float type steam trap that achieves decreased size of device and enhanced discharging capability, improves the valve closing performance, and prevents the occurrence of water hammer.

To achieve the above object, the present invention of a first aspect provides a float type steam trap including a casing having a float chamber and formed with an inflow port and an outflow port communicating with the float chamber; a float provided in the float chamber so as to be capable of being moved up and down; a valve seat communicating with the outflow port in the float chamber; and a valve element, which slides with respect to the valve seat in association with the up-and-down movement of the float so as to be able to open and close the valve seat, provided on the float, wherein the valve seat and the valve element are formed of a material having different wear resistance.

A float type steam trap in accordance with the present invention of a second aspect is characterized by including a casing having a float chamber and formed with an inflow port and an outflow port communicating with the float chamber; a float provided in the float chamber so as to be capable of being moved up and down; a valve seat having a valve seat seal face provided so as to communicate with the outflow port and protrude into the float chamber, an edge of the valve seat seal face having a right angle or acute angle in cross section; a valve element which is formed of a material having lower wear resistance than the valve seat, is provided on the float, and has a valve element seal face which slides with respect to the valve seat seal face in association with the up-and-down movement of the float so as to be able to open and close the valve seat.

A float type steam trap in accordance with the present invention of a third aspect is characterized by including a casing having a float chamber and formed with an inflow port and an outflow port communicating with the float chamber; a float provided in the float chamber so as to be capable of being moved up and down; a valve seat having a valve seat seal face provided so as to communicate with the outflow port and protrude into the float chamber, an edge of the valve seat seal face having a right angle or acute angle in cross section; a valve element which is formed of a material having lower wear resistance than that of the valve seat, has a valve element seal face which slides with respect to the valve seat seal face in association with the up-and-down movement of the float so as to be able to open and close the valve seat, and is provided on the float so that when sliding with respect to the valve seat seal face, the valve element swayingly moves in the direction perpendicular to the valve seat seal face so that the valve element seal face can be brought into contact with the edge.

A float type steam trap in accordance with the present invention of a fourth aspect is characterized in that in the float type steam trap according to the present invention of the first, second, or third aspect, the valve seat is formed of stainless steel or other metals or ceramics, and the valve element is formed of carbon or stainless steel or other metals having lower wear resistance than the valve seat; and when either one of the valve seat and the valve element is formed of stainless steel or other metals, the other is formed of ceramics or carbon.

A float type steam trap in accordance with the present invention of a fifth aspect is characterized by including a casing having a float chamber and formed with an inflow port and an outflow port communicating with the float chamber; a float provided in the float chamber so as to be capable of being moved up and down; a valve seat having a valve seat seal face provided so as to communicate with the outflow port and protrude into the float chamber; a valve element which is formed of a material having higher wear resistance than the valve seat, is provided on the float, and has a valve element seal face which slides with respect to the valve seat seal face in association with the up-and-down movement of the float so as to be able to open and close the valve seat, an edge of the valve element seal face having a right angle or acute angle in cross section.

A float type steam trap in accordance with the present invention of a sixth aspect is characterized by including a casing having a float chamber and formed with an inflow port and an outflow port communicating with the float chamber; a float provided in the float chamber so as to be capable of being moved up and down; a valve seat having a valve seat seal face provided so as to communicate with the outflow port and protrude into the float chamber; a valve element which is formed of a material having higher wear resistance than the valve seat, has a valve element seal face which slides with respect to the valve seat seal face in association with the up-and-down movement of the float so as to be able to open and close the valve seat, an edge of the valve element seal face having a right angle or acute angle in cross section, and is provided on the float so that when sliding with respect to the valve seat seal face, the valve element swayingly moves in the direction perpendicular to the valve seat seal face so that the edge can be brought into contact with the valve seat seal face.

A float type steam trap in accordance with the present invention of a seventh aspect is characterized in that in the float type steam trap according to the present invention of the first, fifth, or sixth aspect, the valve element is formed of stainless steel or other metals or ceramics, and the valve seat is formed of carbon or stainless steel or other metals having lower wear resistance than the valve element; and when either one of the valve element and the valve seat is formed of stainless steel or other metals, the other is formed of ceramics or carbon.

A float type steam trap in accordance with the present invention of an eighth aspect is characterized in that in the float type steam trap according to any one of the present inventions of the first to seventh aspects, the seal faces of the valve seat and the valve element have a curved shape protruding from the periphery in the direction opposed to each other, and the periphery is inclined in a tapered shape.

A float type steam trap in accordance with the present invention of a ninth aspect is characterized in that in the float type steam trap according to the present invention of the eighth aspect, the steam trap further includes a holder, the holder having a flow path communicating with the outflow port therein and being fixed to the casing in the float chamber, and the valve seat being provided on the holder so as to communicate with the flow path; and the float has a float body and a lever, the valve element being provided on the lever, and one end of the lever being fixed to the float body and the other end being supported by the holder so as to be turnable in such a manner that the valve element slides with respect to the valve seat in association with the up-and-down movement of the float body so as to be able to open and close the valve seat.

A float type steam trap in accordance with the present invention of a tenth aspect is characterized in that in the float type steam trap according to the present invention of the ninth aspect, the holder has a plurality of valve seats on one side; a plurality of the valve elements are provided on the lever so as to correspond to each of the valve seats; and the other end of the lever is supported by the holder so as to be turnable in such a manner that each of the valve elements slides with respect to each of the valve seats in association with the up-and-down movement of the float body so as to be able to open and close each of the valve seats.

A float type steam trap in accordance with the present invention of an eleventh aspect is characterized in that in the float type steam trap according to the present invention of the eighth, ninth, or tenth aspect, the valve element is provided on the float so as to be turnable around an axis perpendicular to the sliding direction, and when the valve element closes the valve seat, the turning center of the valve element and the center of an opening of the valve seat shift from each other.

A float type steam trap in accordance with the present invention of a twelfth aspect is characterized in that in the float type steam trap according to the present invention of the eighth, ninth, tenth, or eleventh aspect, the steam trap has a plug member that is replaceable with the valve seat.

A float type steam trap in accordance with the present invention of a thirteenth aspect is characterized in that in the float type steam trap according to the present invention of the ninth, tenth, eleventh, or twelfth aspect, the casing is capable of being opened and closed, and the holder is fixed to the casing detachably.

According to the above-described float type steam trap in accordance with the present invention, when a fluid flows into the float chamber through the inflow port and accumulates to a predetermined amount in the float chamber, the float is raised by a buoyancy. The float can be moved up and down in the float chamber. If the float rises, the valve element slides with respect to the valve seat in association with the movement of float, by which the valve seat is opened. Thereby, the fluid accumulating in the float chamber is discharged from the valve seat to the outflow port. If the fluid is discharged from the float chamber, the float lowers, and hence the valve element slides to close the valve seat.

Thus, since the valve element slides with respect to the valve seat to open and close the valve seat, the size of device can be decreased, and also the service pressure range can be widened. Further, the durability can be improved, and the continuous discharge can be effected when the amount of condensate is small. Also, since the change in discharge area is gradual, the occurrence of water hammer caused by sudden closure of inner valve can be prevented. Further, since the valve element seal face is in plane contact with the valve seat, the higher the fluid pressure is, the higher the specific pressure of seal face is, so that the closing property is high.

In the float type steam trap in accordance with the present invention, since the valve seat and the valve element are formed of a material having different wear resistance, when the valve element slides with respect to the valve seat to open and close the valve seat, either one of the valve seat and the valve element having lower wear resistance wears and hence the degree of sealing increases, and further the frictional resistance decreases. Therefore, the resistance to opening/closing operation of the valve element decreases with the elapse of service time, so that the operating performance is improved. It is preferable that the valve element and the valve seat be urged each other so that the valve element can slide even these elements are worn. Either one of the valve seat and the valve element having lower wear resistance preferably has high hardness than one having higher wear resistance.

Furthermore, in the float type steam trap in accordance with the present invention of the second aspect, when the valve element slides with respect to the valve seat, adhering matters such as scale and dirt on the surface are scraped off by the edge of the valve seat seal face having a right angle or acute angle in cross section pressed against the valve element seal face of the valve element. If scale, dirt, etc. adhere to the valve element and the valve seat, the frictional resistance of valve element surface is increased, and thus the workable pressure may be decreased. In the float type steam trap in accordance with the present invention of the second aspect, by scraping off adhering matters on the valve element seal face, the decrease in workable pressure caused by the adhering matters is prevented, so that the operating performance can be improved, and proper performance can be kept.

In the float type steam trap in accordance with the present invention of the third aspect, when the valve element slides with respect to the valve seat, adhering matters such as scale and dirt on the surface are scraped off by the edge of the valve seat seal face having a right angle or acute angle in cross section pressed against the valve element seal face of the valve element. At this time, the valve element swayingly moves in the direction perpendicular to the valve seat seal face so that the valve element seal face is brought into contact with the edge. Therefore, the adhering matters on the surface of valve element seal face can easily be scraped off. If scale, dirt, etc. adhere to the valve element and the valve seat, the frictional resistance of valve element surface is increased, and thus the workable pressure may be decreased. In the float type steam trap in accordance with the present invention of the second aspect, by scraping off adhering matters on the valve element seal face, the decrease in workable pressure caused by the adhering matters is prevented, so that the operating performance can be improved, and proper performance can be kept.

In the float type steam trap in accordance with the present invention of the fifth aspect, when the valve element slides with respect to the valve seat, adhering matters such as scale and dirt on the surface are scraped off by the edge of the valve element seal face having a right angle or acute angle in cross section pressed against the valve seat seal face of the valve element. If scale, dirt, etc. adhere to the valve element and the valve seat, the frictional resistance of valve element surface is increased, and thus the workable pressure may be decreased. In the float type steam trap in accordance with the present invention of the third aspect, by scraping off adhering matters on the valve seat seal face, the decrease in workable pressure caused by the adhering matters is prevented, so that the operating performance can be improved, and proper performance can be kept.

In the float type steam trap in accordance with the present invention of the sixth aspect, when the valve element slides with respect to the valve seat, adhering matters such as scale and dirt on the surface are scraped off by the edge of the valve element seal face having a right angle or acute angle in cross section pressed against the valve seat seal face of the valve element. At this time, the valve element swayingly moves in the direction perpendicular to the valve seat seal face so that the edge is brought into contact with the valve seat seal face. Therefore, the adhering matters on the surface of valve seat seal face can easily be scraped off. If scale, dirt, etc. adhere to the valve element and the valve seat, the frictional resistance of valve element surface is increased, and thus the workable pressure may be decreased. In the float type steam trap in accordance with the present invention of the fourth aspect, by scraping off adhering matters on the valve seat seal face, the decrease in workable pressure caused by the adhering matters is prevented, so that the operating performance can be improved, and proper performance can be kept.

In the present invention, a gap is preferably provided between support members of valve element and valve element to facilitate the swaying movement of valve element.

The float may be provided so as to be movable up and down by sliding with respect to a guide member provided in the float chamber, or may be provided so as to be movable up and down by being fixed to one end of lever and by supporting the other end of lever on the casing so as to be turnable. The number of valve seats may be one or two or more.

In the float type steam trap in accordance with the present invention of the eighth aspect, since the valve element slides with respect to the valve seat to open and close the valve seat, the size of device can be decreased, and also the service pressure range can be widened. Further, the durability can be improved, and the continuous discharge can be effected when the amount of condensate is small. Also, since the change in discharge area is gradual, the occurrence of water hammer caused by sudden closure of inner valve can be prevented. Further, since the valve element seal face is in plane contact with the valve seat, the higher the fluid pressure is, the higher the specific pressure of seal face is, so that the closing property is high. Also, since the construction is such that the seal faces of the valve seat and valve element have a curved shape protruding from the periphery in the direction opposed to each other, as compared with the case where the valve seat seal faces of the valve seat and valve element have a simple flat shape, the specific pressure of the valve seat is increased, by which the valve closing performance can be enhanced, and also the damage in valve seat can be reduced. Further, the tapered shape reduces catching at the time of opening and closing as compared with the simple flat shape, so that the parts are less liable to be damaged.

In the float type steam trap in accordance with the present invention of the ninth aspect, when a buoyancy acts on the float, one end side of the lever turns upward with respect to the holder, and the valve element slides with respect to the valve seat to open the valve seat. Thereupon, the fluid accumulating in the float chamber flows through the valve seat and the flow path in the holder and is discharged through the outflow port. When the condensate is discharged from the float chamber, the float lowers, and one end side of the lever is turned downward with respect to the holder, by which the valve element is slid with respect to the valve seat to close the valve seat. By this configuration, a device having a simple construction and small size can be realized.

Furthermore, by changing the distance between the turning center of lever and the center of valve element, a lever ratio (L1/L2) can be increased, so that the service pressure range can be widened easily, and the device can be used at high pressures. Also, since the lever ratio (L1/L2) can be increased, the device can be made small in size as compared with a device having the same discharging capability and service pressure. Further, since the float body and the lever of float are integral, the movement of the float is restricted only to up-and-down turning movement. Therefore, the float is not moved violently even by the disturbance such as vibrations, so that the float can be prevented from being damaged.

It is preferable that the valve seat be provided on the holder so as communicate with the flow path on the bottom side of the casing at a position lower than the inflow port and outflow port. Further, if the lever is configured so as to be removed easily from the holder, the maintenance work can be made easy. The number of valve seats may be one or two or more, and the valve seat may be provided on only one side or both sides of the holder.

In the float type steam trap in accordance with the present invention of the tenth aspect, by increasing the number of valve seats, the range of discharge performance can be widened, and also the commonness of parts can be achieved. Also, by closing the valve seat, the discharging capability can be changed easily. In this case, the valve seat is preferably replaced with the plug member easily.

In the float type steam trap in accordance with the present invention of the eleventh aspect, since the valve element is not fixed to the float but is provided so as to be turnable, when the valve element slides on the valve seat, it can be turned freely. Therefore, the seal face is less liable to be damaged, and fluid scale etc. are less liable to adhere, so that the valve closing performance can be kept, and the service life of parts can be prolonged. It is preferable that the valve element be provided on the float so as to be turnable around an axis perpendicular to the sliding direction and the valve seat seal face of the valve seat. Also, the valve element is preferably provided so as to be turnable with respect to the lever.

In the float type steam trap in accordance with the present invention, the seal faces of the valve seat and vale element may have a curved shape protruding from the periphery in the direction opposed to each other.

According to this configuration, as compared with the case where the valve seat seal faces of the valve seat and valve element have a simple flat shape, the specific pressure of the valve seat is increased, by which the valve closing performance can be enhanced, and also the damage in valve seat can be reduced.

In the float type steam trap in accordance with the present invention of the thirteenth aspect, after the device is installed to the tubes, integral parts of the float, the valve element, and the holder can collectively be taken out to the outside merely by removing the holder from the casing by opening the casing, without removing the casing from the tubes.

DETAILED DESCRIPTION OF THE PREFERRED EMBODIMENTS

FIGS. 1 to 12 show an embodiment of the present invention.

Figure 1:
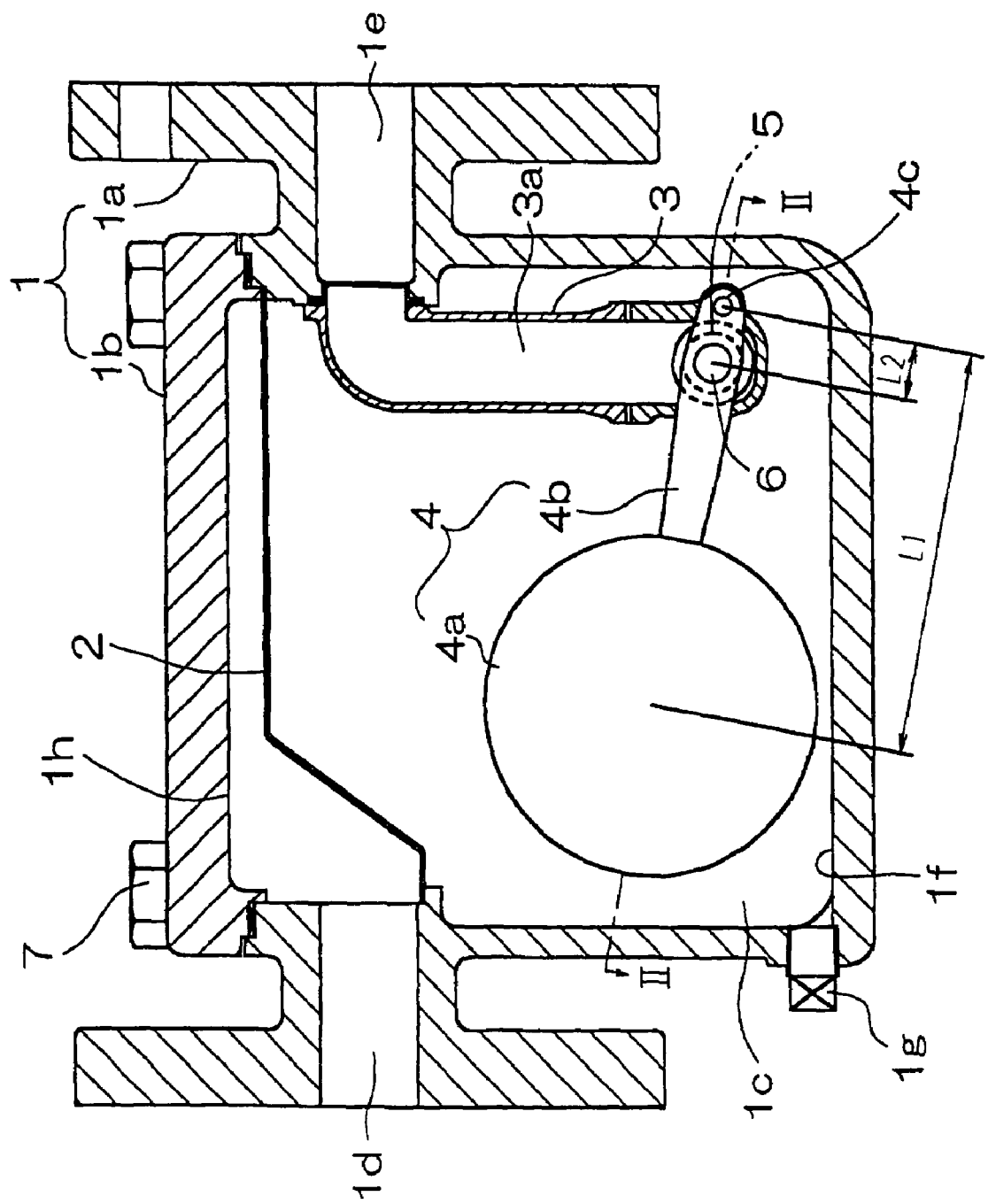
FIG. 1 is a sectional view of a float type steam trap in accordance with an embodiment of the present invention.

As shown in FIG. 1, a float type steam trap includes a casing 1, a strainer 2, a holder 3, a float 4, a valve seat 5, and a valve element 6. The casing 1 is constructed so that a cover 1b is threadedly engaged with a body 1a so as to be able to be opened and closed by using bolts 7.

The casing 1 has a float chamber 1c in the interior thereof, and also has an inflow port 1d and an outflow port 1e communicating with the float chamber 1c. The inflow port 1d and the outflow port 1e allow condensate to flow into and out of the float chamber 1c, respectively. A hole is formed in the side wall of the casing 1 at a position near a bottom 1f of the casing 1, and this hole is plugged with a plug 1g. The strainer 2 is provided on the inflow side of the float chamber 1c near an opening 1h of the body 1a to prevent foreign matters such as dirt from flowing into the float chamber 1c.

Figure 2:
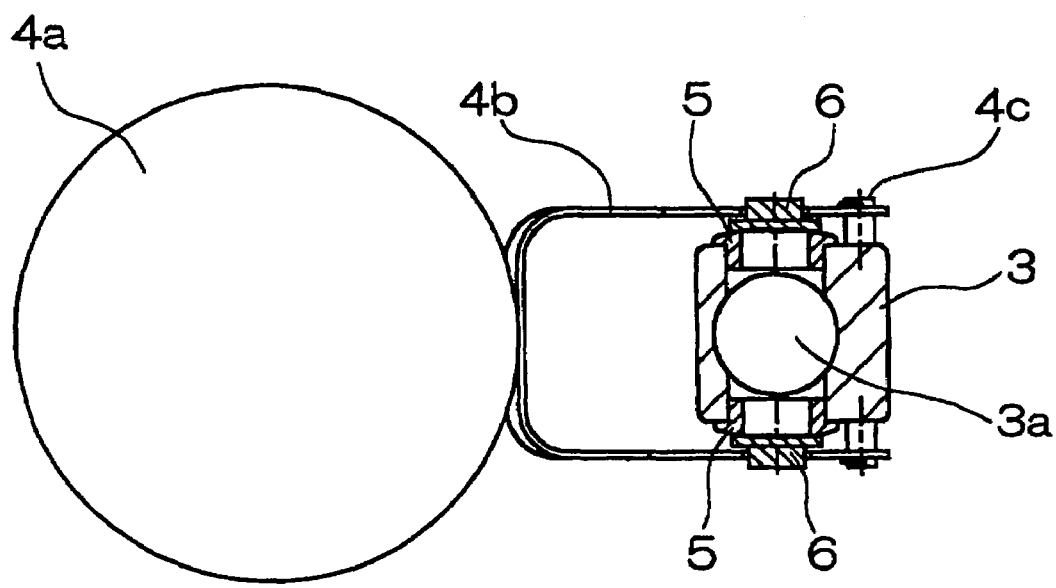
FIG. 2 is a sectional view taken along the line II—II of FIG. 1.
Figure 9:
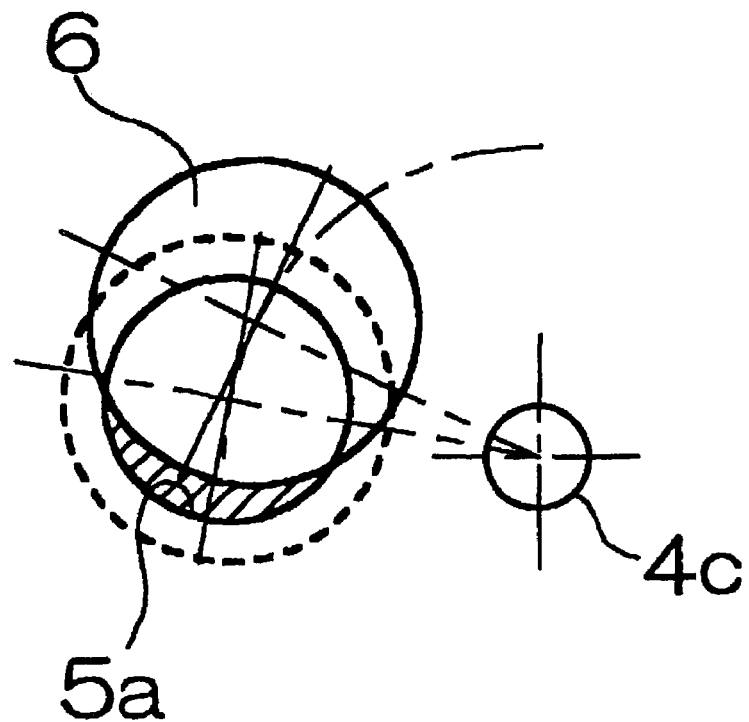
FIG. 9 is an explanatory view showing a change in opening area of valve seat of the float type steam trap shown in FIG. 1.

The holder 3 is of a tubular shape, and is detachably fixed to the outflow port 1e on the inside of the float chamber 1c of the casing 1. The holder 3 has a flow path 3a communicating with the outflow port 1e in the interior thereof. The holder 3 extends between the outflow port 1e and the bottom 1f. As shown in FIG. 2, the valve seat 5 is fixed on both side surfaces of a bottom-side end portion of the holder 3 so as to communicate with the flow path 3a and the outflow port 1e. Each of the valve seats 5 is detachably screwed in a hole formed in the holder 3. As shown in FIG. 9, each of the valve seats 5 is provided with an opening 5a that is capable of being opened and closed by the valve element 6. Condensate can be discharged from the outflow port 1e through the opening 5a of each of the valve seats 5.

As shown in FIGS. 11(A) and 11(B), the valve seat 5 has a valve seat seal face 5b around the opening 5a. The valve seat seal face 5b is provided so as to protrude in the float chamber. As shown in FIG. 11(B), the valve seat 5 is constructed so that an edge 5c of the valve seat seal face 5b has a right angle in cross section, and the valve seat seal face 5b protrudes from an outer periphery side end face 5d so as to form a difference in level.

Figure 3:
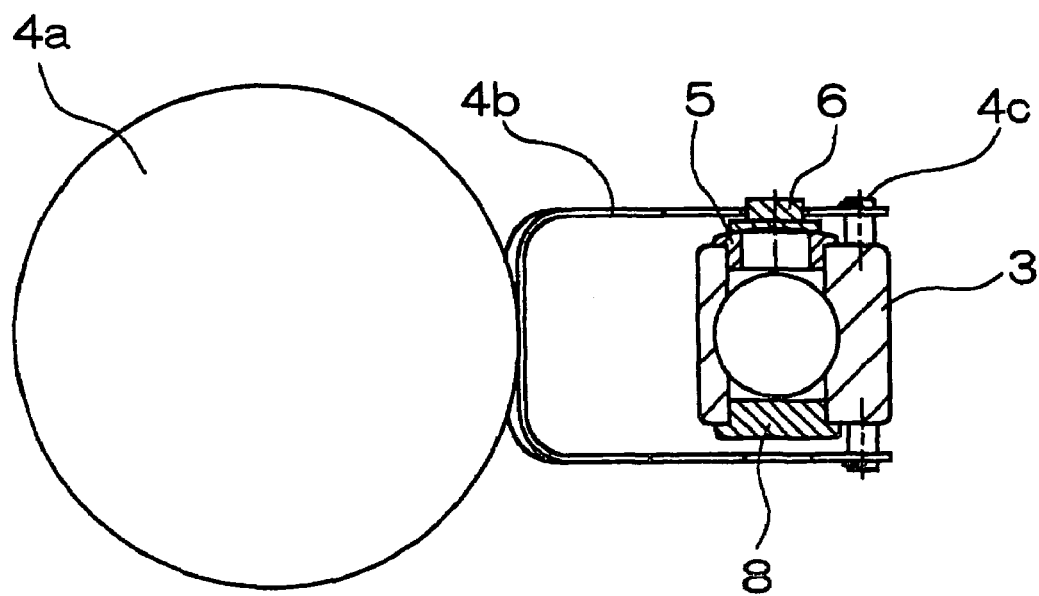
FIG. 3 is a sectional view of a modification of the float type steam trap shown in FIG. 1, corresponding to the sectional view in FIG. 2.
Figure 4:
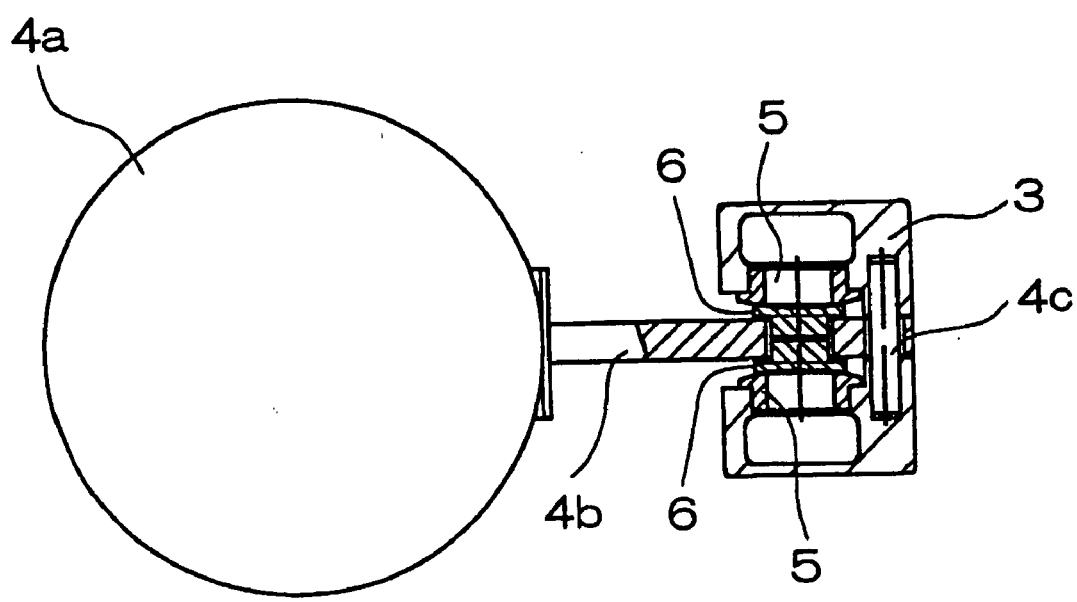
FIG. 4 is a sectional view of another modification of the float type steam trap shown in FIG. 1, corresponding to the sectional view in FIG. 2.
Figure 5:
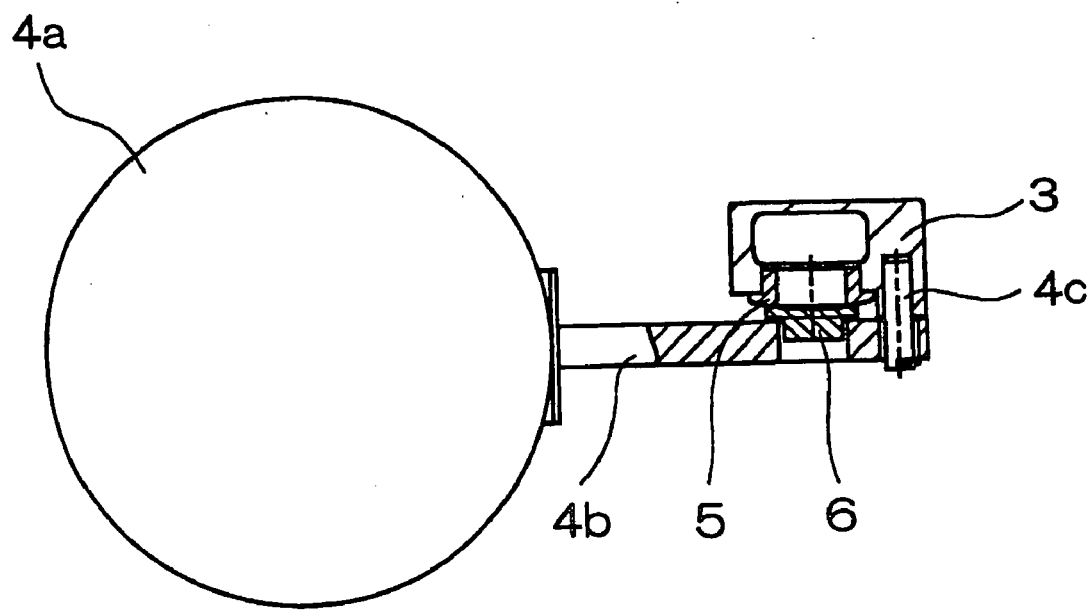
FIG. 5 is a sectional view of still another modification of the float type steam trap shown in FIG. 1, corresponding to the sectional view in FIG. 2.
Figure 6:
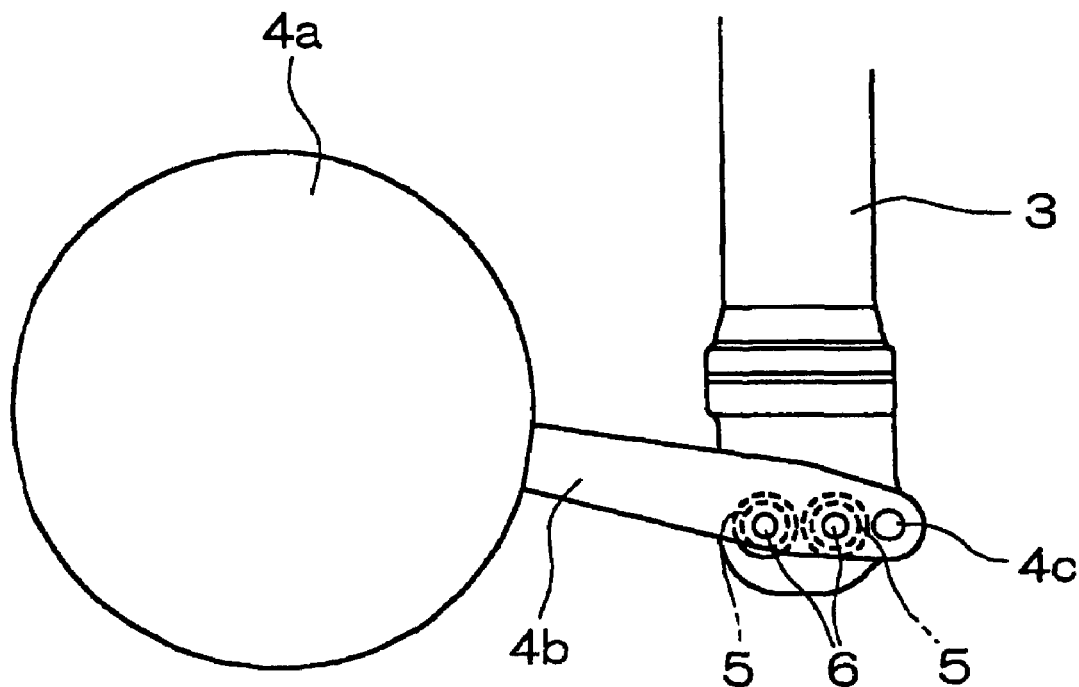
FIG. 6(A) is an explanatory view showing a modification of the float type steam trap shown in FIG. 1, in which a plurality of valve seats are installed.
FIG. 6(B) is a sectional view of this modification, corresponding to the sectional view in FIG. 2.
Figure 6:
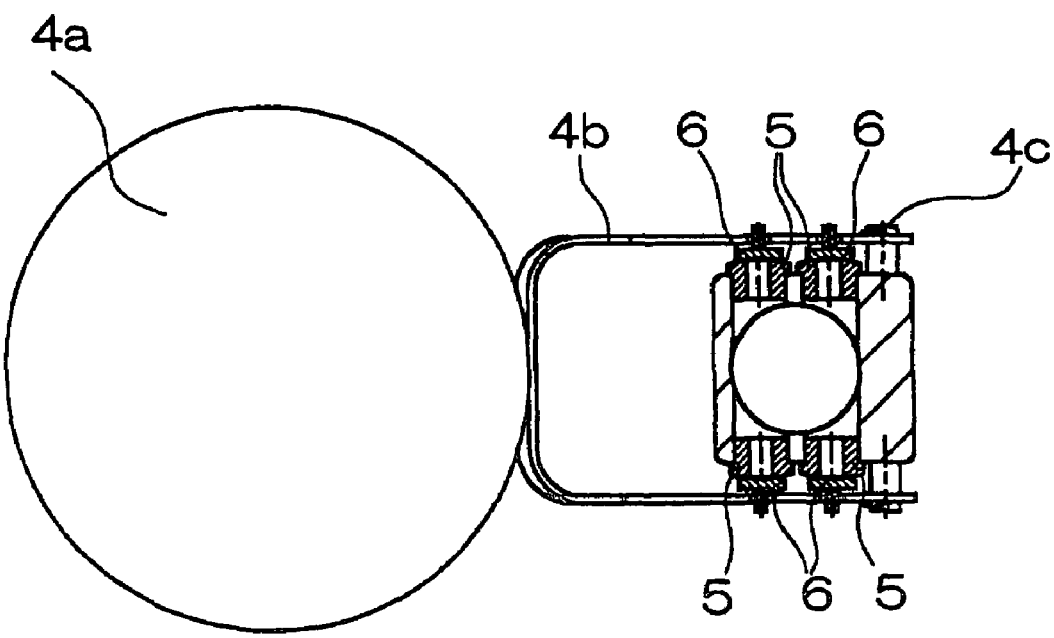

It is preferable that the valve seat 5 be easily replaced with a plug member 8 having no opening 5a as shown in FIG. 3. Also, as shown in FIG. 4, the arrangement may be such that the valve seat 5 is on the outside and the valve element 6 is on the inside. Further, as shown in FIG. 5, the valve seat 5 and the valve element 6 each may be formed by one. Also, as shown in FIGS. 6(A) and 6(B), two valve seats and two valve elements may be provided on one side of the holder 3, that is, four valve seats and four valve elements may be provided in total on both sides.

The float 4 has a float body 4a having a shape of sphere, elongated sphere, and the like and a lever 4b. The float 4 is provided in the float chamber 1c so as to be movable up and down. Since the interior of the float body 4a is in an enclosed state, a buoyancy acts according to the quantity of condensate. The lever 4b is bent into a fork shape, and extends so as to protrude from the float body 4a. As shown in FIG. 2, the valve element 6 is installed on both side faces of the fork-shaped lever 4b at the opposed position to the valve seat 5a so as to be turnable around a turning center 6a. The valve element 6 has a valve element seal face 6b that can open and close the valve seat 5 by sliding with respect to the valve seat seal face 5b in association with the up-and-down movement of the float 4. The outer periphery of the valve element seal face 6b is rounded so as to be curved toward a side face 6c.

Figure 7:
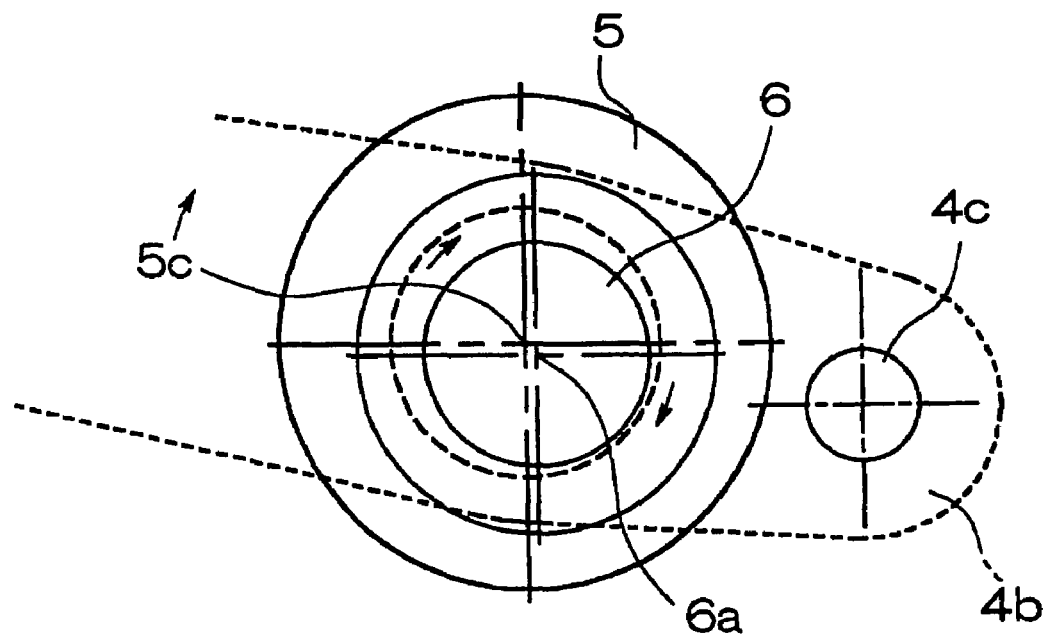
FIG. 7 is an explanatory view showing a shift between the centers of valve element and valve seat of the float type steam trap shown in FIG. 1.

For the lever 4b, one end at the bent position is fixed to the float body 4a, and the other end is rotatably fixed to both sides of the holder 3 with a pin 4c so as to hold the holder 3 therebetween. Therefore, the lever 4b turns up and down in the float chamber 1c with the pin 4c being a fulcrum. Thereby, the valve element 6 is turned together with the lever 4b in association with the up-and-down movement of the float body 4a, and can open and close the valve seat 5 by sliding with respect to the valve seat 5. The valve element 6 is installed so as to be turnable with respect to the lever 4b around an axis perpendicular to the sliding direction and the valve seat seal face 5b of the valve seat 5 (see FIG. 8). The valve element 6 is provided in a mounting hole 4d in the lever 4b so as to provide a gap. When the valve element 6 slides with respect to the valve seat seal face 5b, the valve element 6 swayingly moves in the direction perpendicular to the valve seat seal face 5b so that the valve element seal face 6b can be brought into contact with the edge 5c. As shown in FIG. 7, design may be made so that when the valve element 6 closes the valve seat 5, the turning center 6a of the valve element 6 and a center 5c of the opening 5a of the valve seat 5 shift from each other. In this case, the specific pressure of the valve seat seal face 5b and the valve element seal face 6b generated by a fluid force is nonuniform, so that the valve element 6 is easy to turn.

The valve seat 5 is formed of stainless steel. The valve element 6 is formed of a carbon material. The material forming the valve element 6 is a material that has a lower friction coefficient than stainless steel forming the valve seat 5 and can be manufactured easily. This material has a considerably lower wear resistance than the general valve seat and valve element formed of stainless steel, and also has high hardness. By manufacturing the valve element of a carbon material having a low friction coefficient, the workable pressure of trap can be increased. As an example, stainless steel with hardness HRC11 or 56 can be used as a material for the valve seat 5, and carbon with hardness HRC68 can be used as a material for the valve element 6. In the case of carbon, since the degree of bond between particles is low though the hardness is high, the valve element 6 is liable to wear when it is slid with respect to stainless steel.

Conventionally, a metal is used as the material for the valve seat and valve element, and the surface is smoothened by increasing the machining accuracy to decrease the friction coefficient of seal face, or heat treatment is accomplished or an alloy is deposited to increase the wear resistance of surface in order to keep the soundness of surface even during the service period. Such treatment is a cause for increasing the manufacturing cost. Contrarily, in the float type steam trap of this embodiment, the valve element 6 is formed of a non-metallic material that has a lower friction coefficient than a metal and can be manufactured easily, that is, a carbon material or a ceramic material, so that the valve element 6 can be manufactured more easily than the case where a metal is used as the material, and hence the manufacturing cost can be reduced.

A force necessary for the operation, that is, a force F necessary for slidingly move the valve element on the valve seat is expressed as $$F = \mu \times A \times P$$

where, $\mu$ is friction coefficient, A is valve seat area, and P is fluid pressure. A and P become fixed values when the trap size and conditions are determined, so that the force F is a function of friction coefficient $\mu$. Usually, a metal is used as the material for the valve seat. In this case, the surface is smoothened (machining accuracy is increased) to decrease the friction coefficient $\mu$, or the wear resistance of surface is increased (heat treatment is accomplished or an alloy is deposited). If a carbon material having self-lubricating property is used as a material for the sliding portion, since the friction coefficient $\mu$ decreases to about one half of that of metallic material, the force F necessary for the operation also decreases to about one half. Therefore, when the trap size and the service conditions are fixed, the device can be made small in size. When the size of device is fixed, the service pressure can be increased.

Both of the valve seat 5 and the valve element 6 may be formed of a carbon material or a ceramic material. Also, the material for the valve seat 5 may be carbon or ceramics, and the material for the valve element 6 may be stainless steel or the like metal. In the case of carbon, since the friction coefficient is lower than stainless steel and the degree of bond between particles is low though the hardness is high, friction enhances the degree of sealing, which offers an advantage of increased effect of decreased frictional resistance. The material forming the valve element 6 may have higher wear resistance than the material forming the valve seat 5.

In the float type steam trap, since the valve seat 5 and the valve element 6 are formed of a material having different wear resistance, when the valve element 6 slides on the valve seat 5 to open and close the valve seat 5, the valve element 6 that has lower wear resistance than the valve seat 5 wears and the degree of sealing is enhanced, so that the frictional resistance is further decreased. Therefore, the resistance to opening/closing operation of the valve element 6 decreases with the elapse of service time, so that the operating performance is improved.

By the sliding operation of the valve element 6 on the seal face 5b of the valve seat 5, carbon wears, by which the surface of carbon is smoothened as if it is polished by the same effect as that of grinding. In addition to the friction coefficient lower than that of metal, the surface roughness further becomes fine, so that double effects can be anticipated. Also, carbon has high heat resistance, and hence it can be used at a temperature up to 400° C. In the case of steam trap, the fluid used is saturated water or saturated steam, so that the device can be used in all conditions considering saturated steam pressure.

As shown in FIGS. 12(A) and 12(B), as modifications of the valve seat 5 and the valve element 6, an edge 6d of the valve element seal face 6b of the valve element 6 may have an acute angle in cross section in place of the fact that the edge 5c of the valve seat seal face 5b has a right angle in cross section. In this case, the edge 5c of the valve seat 5 is curved and rounded. In this case as well, the valve seat 5 and the valve element 6 are formed of a carbon material or ceramic material that has a lower friction coefficient than a metal and can be manufactured easily, so that the friction coefficient thereof is considerably lower than that of general valve seat and valve element formed of a metal. The valve seat 5 and the valve element 6 formed of such a material can be manufactured easily as compared with the case where a metal is used as the material, so that the manufacturing cost can be reduced.

Figure 8:
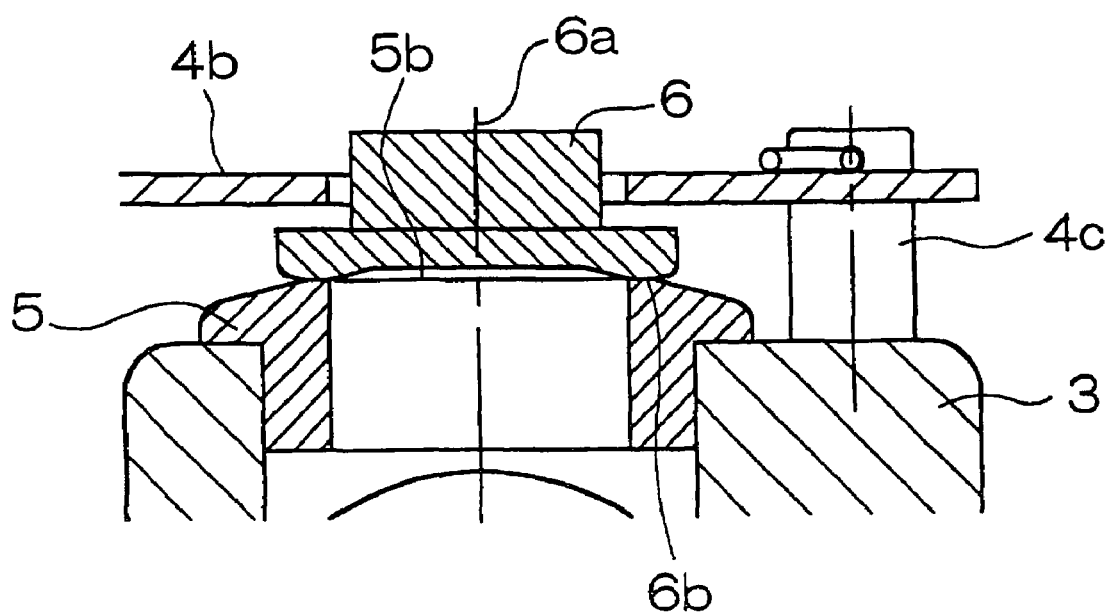
FIG. 8 is an enlarged sectional view of an essential portion, showing modifications of valve element and valve seat of the float type steam trap shown in FIG. 1.

As shown in FIG. 8, as modifications of the valve seat 5 and the valve element 6, the valve seat seal face 5b of the valve seat 5 and the valve element seal face 6b of the valve element 6 may have a curved shape protruding from the periphery in the direction opposed to each other, and the periphery may be inclined in a tapered shape. Thereby, as compared with the case where the valve seat seal face 5b of the valve seat 5 and the valve element seal face 6b of the valve element 6 have a simple flat shape, the substantial valve seat area is decreased, and the specific pressure of the valve seat 5 is increased, by which the valve closing performance can be enhanced. Also, the tapered shape reduces catching at the time of opening and closing as compared with the simple flat shape, so that the parts are less liable to be damaged.

As shown in FIG. 1, in the float type steam trap, condensate flowing from steam-operated equipment or steam tubes (not shown) passes through the strainer 2 through the inflow port 1d, flowing into the float chamber 1c, and accumulates gradually in the float chamber 1c. The float 4 can be moved up and down in the float chamber 1c. If condensate accumulates to a predetermined amount in the float chamber 1c, the float 4 is raised by a buoyancy.

When a buoyancy acts on the float 4, one end side of the lever 4b turns upward with respect to the holder 3, and the valve element 6 slides upward with respect to the valve seat 5 in association with the turning movement of the lever 4, by which the opening 5a of the valve seat 5 is opened. Thereupon, the fluid accumulating in the float chamber 1c flows through the valve seat 5 and the flow path 3a in the holder 3 and is discharged through the outflow port 1e. When the condensate is discharged from the float chamber 1c, the float 4 lowers, and one end side of the lever 4b is turned downward with respect to the holder 3, by which the valve element 6 is slid downward with respect to the valve seat 5 to close the valve seat 5.

Since the fluid pressure always acts in the direction such as to press the valve element 6 on the valve seat 5, the specific pressure of the valve seat seal face 5b of the valve seat 5 and the valve element seal face 6b of the valve element 6 increases the sealing property with an increase in fluid pressure. Also, since the valve element 6 slides on the valve seat 5 and moves on a plane, the valve closing performance is high.

Figure 10:
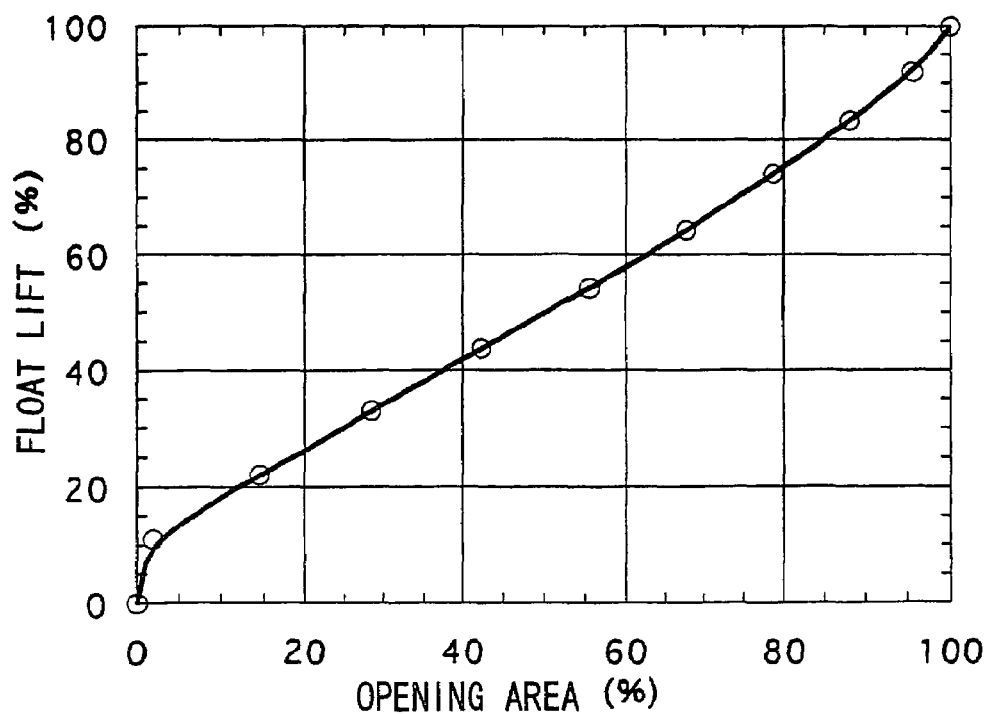
FIG. 10 is a graph showing a change in opening area of valve seat of the float type steam trap shown in FIG. 1.

Thus, since the valve element 6 slides on the valve seat 5 to open and close the valve seat 5, the construction is simple and the size of device is decreased, and also the service pressure range can be widened. As shown in FIG. 9, since the valve element 6 moves so as to slide with respect to the valve seat 5, the change of opening area of the valve seat 5 caused by a float lift (change in water level) is a change of interference area between circles (indicated by hatching). As shown in FIG. 10, the change in opening area is very gradual as compared with a vertically moving valve seat or a spherical valve seat. Therefore, the occurrence of water hammer caused by sudden closure of inner valve can be prevented. Also, in the open state, continuous discharge can be effected even when the amount of condensate is small. Since the number of operations is decreased, the durability can be improved, and the service life of parts can be prolonged.

Furthermore, since the valve element 6 can be provided at a position just close to the pin 4c, which is the fulcrum of the lever 4b, the lever ratio (L1/L2, see FIG. 1) can be increased dramatically as compared with the conventional construction in which the valve seat 5 is provided on the outside of the lever fulcrum. Therefore, the device can be used at high pressures, and hence the size of device can be decreased.

Also, since the float body 4a of the float 4 is integral with the lever 4b and the movement of the float 4 is restricted only to up-and-down turning movement, the float 4 is not moved violently even by the disturbance such as vibrations, so that the float 4 can be prevented from being damaged. Since the lever 4b is easily removed from the holder 3, it can be serviced easily by being taken out of the casing 1.

One valve seat 5 or a plurality of valve seats 5 can be provided on one side or on both sides of the holder 3 by changing the number thereof according to the required discharge amount. Therefore, by increasing the number of valve seats 5, the range of discharge performance can be widened, and also the commonness of parts can be achieved. Further, by closing the valve seat 5, the discharge capability can be changed easily. In the conventional device, when the hole diameter of the valve seat 5 is increased to increase the discharging capability, the fully opened state cannot be established without an increase in operation angle of the float 4. Contrarily, when a plurality of valve seats 5 and valve elements 6 are provided, even if the operation angle of the float 4 is small, the discharging capability can be increased by increasing the opening area.

In the float type steam trap, the valve element 6 is not fixed to the lever 4b, but is provided on the lever 4b so as to be turnable, so that the valve element 6 can turn freely when sliding on the valve seat 5. Therefore, the valve seat seal face 5b and the valve element seal face 6b are less liable to be damaged. Also, the device has a self-purification effect of removing scale adhering to the valve seat 5. Therefore, an effect of enhancing the valve closing performance can be achieved, and the service life of parts can be prolonged.

After the float type steam trap is installed to the tubes, integral parts of the float 4, the valve elements 6, the valve seats 5, and the holder 3 can collectively be taken out to the outside merely by removing the holder 3 from the casing 1 by opening the casing 1 after the cover 1b is removed from the body 1a, without removing the casing 1 from the tubes thereby achieving easy maintenance and cost reduction.

Figure 11:
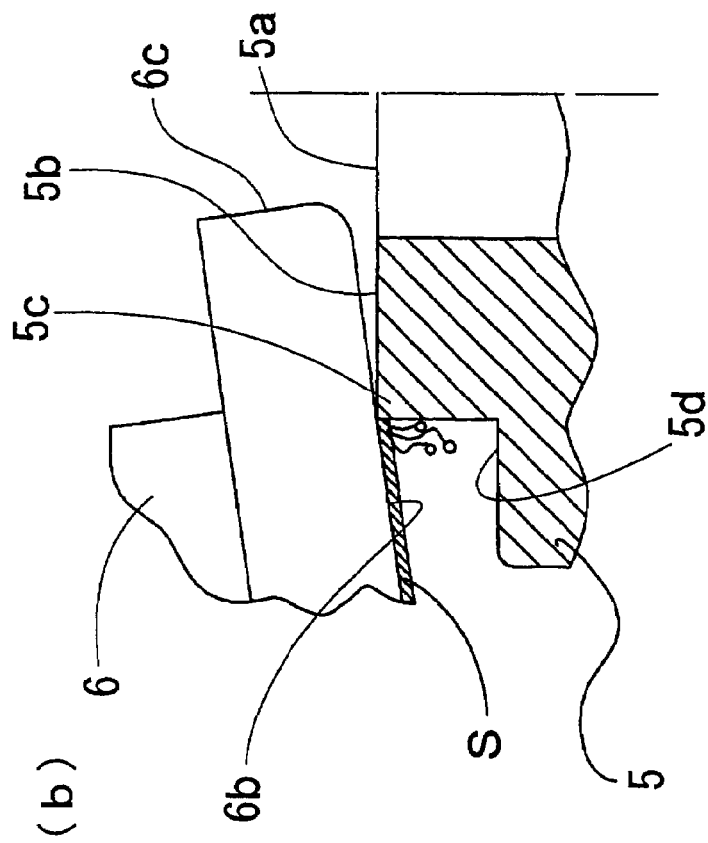
FIGS. 11(A) and 11(B) are a sectional view and an enlarged sectional view of an essential portion, respectively, showing a valve element and valve seat of the float type steam trap shown in FIG. 1.
Figure 11:
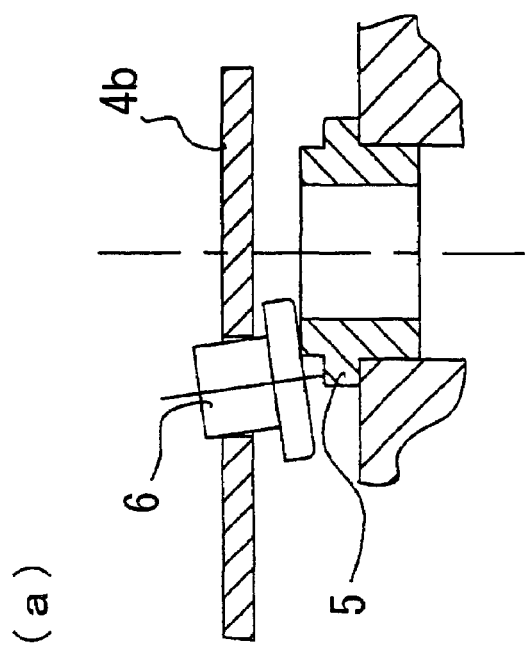
Figure 12:
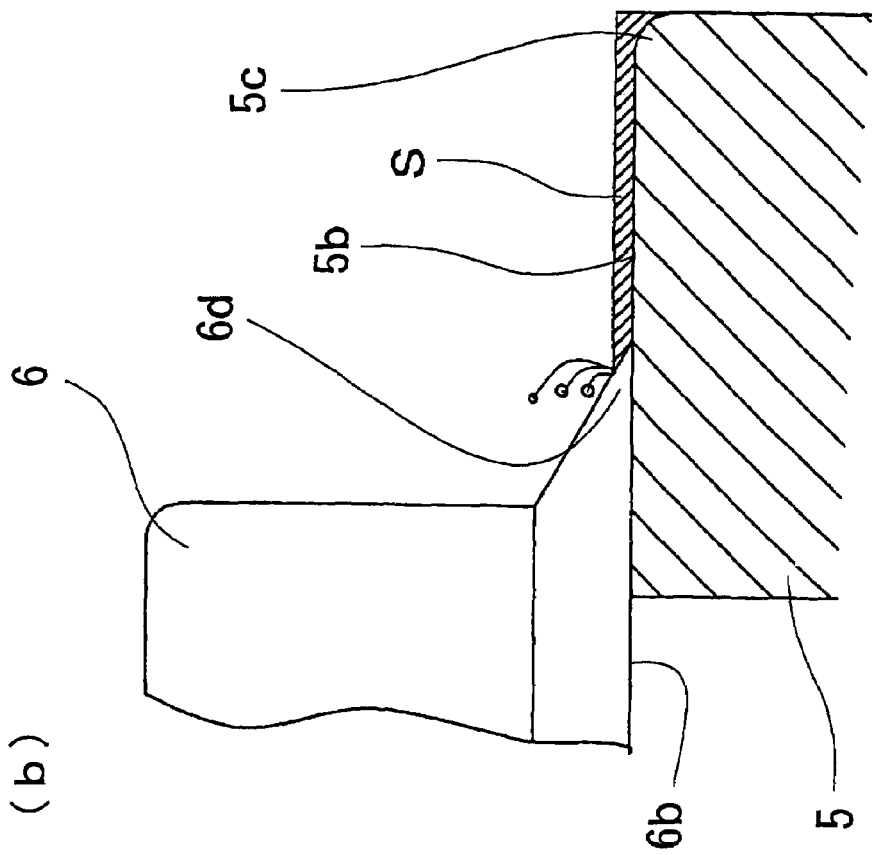
FIGS. 12(A) and 12(B) area sectional view and an enlarged sectional view of an essential portion, respectively, showing modifications of valve element and valve seat of the float type steam trap shown in FIG. 1.
Figure 12:
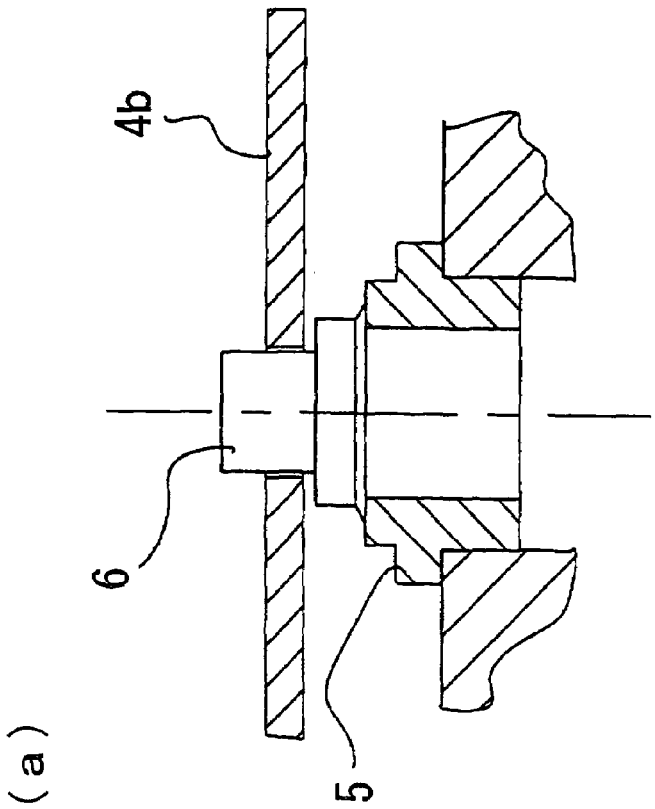
Figure 13:
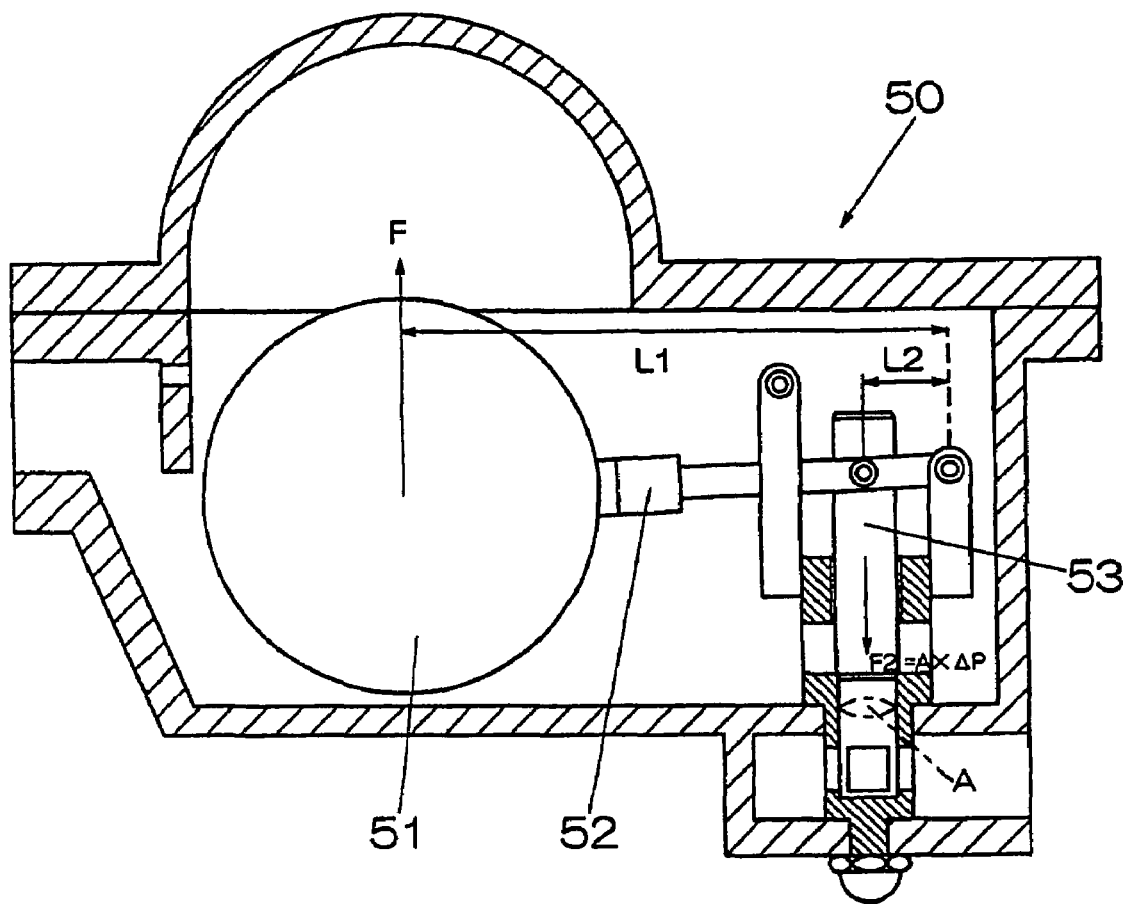
FIG. 13 is a sectional view of a conventional float type steam trap.
Figure 14:
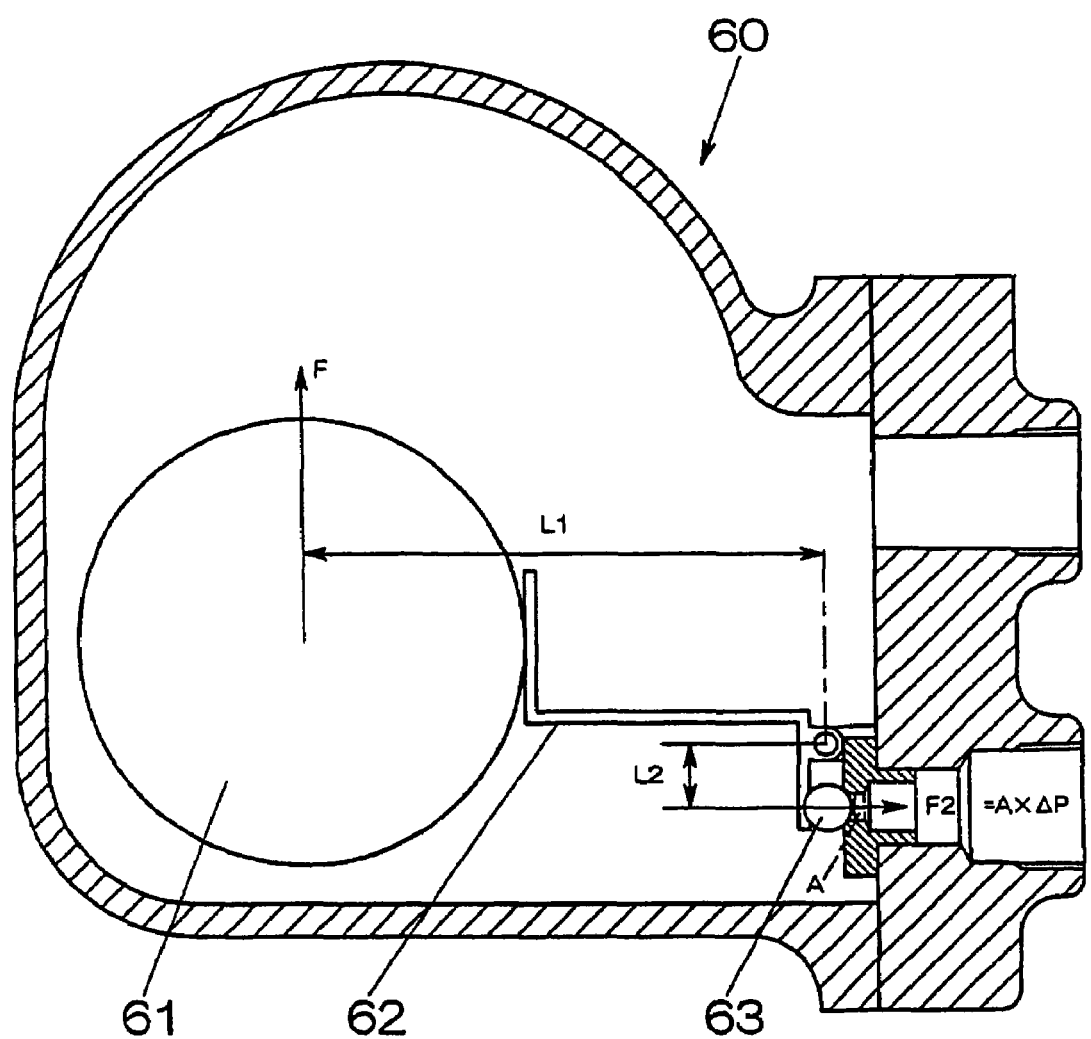
FIG. 14 is a sectional view of another conventional float type steam trap.

Furthermore, as shown in FIG. 11, in this float type steam trap, when the valve element 6 is slid with respect to the valve seat 5, adhering matters S such as scale and dirt on the surface of the valve element seal face 6b can be scraped off by the edge 5c of the valve seat seal face 5b having a right angle in cross section pressed against the valve element seal face 6b of the valve element 6. At this time, the valve element 6 swayingly moves with respect to the direction perpendicular to the valve seat seal face 5b, and the valve element seal face 6b is brought into contact with the edge 5c. Therefore, the adhering matters S on the surface of the valve element seal face 6b are easily scraped off.

In the conventional float type steam trap in which the valve element slides with respect to the valve seat, dirt (scale) in condensate adheres to the valve element and valve seat depending on the condition of the equipment or tube to which the device is installed, by which the frictional resistance on the surface of valve element is increased. As a result, the workable pressure of steam trap may be decreased during the use. Contrarily, in the float type steam trap shown in FIG. 11, by scraping off the adhering matters S on the valve element seal face 6b, the decrease in workable pressure caused by the adhering matters S is prevented, so that the operating performance can be improved, and proper performance can be kept. The edge 5c achieves a great effect especially when being operated in the closing direction from a position near the fully opened position.

As shown in FIGS. 12(A) and 12(B), in the case where the edge 6d of the valve element seal face 6b of the valve element 6 has an acute angle in cross section, when the valve element 6 slides on the valve seat 5, adhering matters S such as scale and dirt on the surface of the valve seat seal face 5b can be scraped off by the edge 6d of the valve element seal face 6b having an acute angle in cross section pressed against the valve seat seal face 5b of the valve element 5. At this time, the valve element 6 swayingly moves with respect to the direction perpendicular to the valve seat seal face 5b, and the edge 6d is brought into contact with the valve seat seal face 5b. Therefore, the adhering matters S on the surface of the valve seat seal face 5b are easily scraped off. If scale, dirt, etc. adhere to the valve element 6 and the valve seat 5, the frictional resistance of valve element surface is increased, and thus the workable pressure maybe decreased. By scraping off the adhering matters S on the valve seat seal face 5b, the decrease in workable pressure caused by the adhering matters S is prevented, so that the operating performance can be improved, and proper performance can be kept. During the operation, since the pressure in the trap acts in the direction such that the valve element 6 is pressed on the valve seat 5, the higher the pressure is, the greater the effect of the edge 6d is.

According to the float type steam trap in accordance with the present invention, the size of device can be decreased and the discharging capability can be enhanced. Further, since the valve element slides on a plane with respect to the valve seat, the valve closing performance is high. Also, since the change in opening area of valve is gradual, the occurrence of water hammer caused by sudden closure of inner valve can be prevented. Moreover, according to the float type steam trap in accordance with the present invention, the closing performance can be improved.

What is claimed is:

1. A float type steam trap comprising:
   a casing having a float chamber and formed with an inflow port and an outflow port communicating with said float chamber;
   a float provided in said float chamber so as to be capable of being moved up and down;
   a valve seat communicating with said outflow port in said float chamber; and
   a valve element provided on said float, said valve element sliding with respect to said valve seat in association with the up-and-down movement of said float so as to be able to open and close said valve seat, wherein
   said valve seat is formed of stainless steel or other metals or ceramics, and said valve element is formed of carbon or stainless steel or other metals having lower wear resistance than said valve seat; and when either one of said valve seat and said valve element is formed of stainless steel or other metals, the other is formed of ceramics or carbon.

2. The float type steam trap according to claim 1, wherein said valve seat has a valve seat seal face provided so as to communicate with said outflow port and protrude into said float chamber, an edge of said valve seat seal face having a right angle or acute angle in cross section; and said valve element has a valve element seal face which slides with respect to said valve seat seal face in association with the up-and-down movement of said float so as to be able to open and close said valve seat.

3. The float type steam trap according to claim 2, wherein said valve element is provided on said float so that when sliding with respect to said valve seat seal face, said valve element swayingly moves in a direction perpendicular to said valve seat seal face so that said valve element seal face can be brought into contact with said edge.

4. A float type steam trap comprising:
   a casing having a float chamber and formed with an inflow port and an outflow port communicating with said float chamber;
   a float provided in said float chamber so as to be capable of being moved up and down;
   a valve seat communicating with said outflow port in said float chamber; and
   a valve element provided on said float, said valve element sliding with respect to said valve seat in association with the up-and-down movement of said float so as to be able to open and close said valve seat, wherein
   said valve element is formed of stainless steel or other metals or ceramics, and said valve seat is formed of carbon or stainless steel or other metals having lower wear resistance than said valve element; and when either one of said valve element and said valve seat is formed of stainless steel or other metals, the other is formed of ceramics or carbon.

5. The float type steam trap according to claim 4, wherein said valve seat has a valve seat seal face provided so as to communicate with said outflow port and protrude into said float chamber; and said valve element has a valve element seal face which slides with respect to said valve seat seal face in association with the up-and-down movement of said float so as to be able to open and close said valve seat, an edge of said valve element seal face having a right angle or acute angle in cross section.

6. The float type steam trap according to claim 5, wherein said valve element is provided on said float so that when sliding with respect to said valve seat seal face, said valve element swayingly moves in the direction perpendicular to said valve seat seal face so that said edge can be brought into contact with said valve seat seal face.

7. The float type steam trap according to any one of claims 1 to 6, wherein seal faces of said valve seat and said valve element have a curved shape protruding from a periphery of said valve seat and said valve element in a direction opposed to each other, said periphery being inclined in a tapered shape.

8. The float type steam trap according to claim 7, further comprising a holder, said holder having a flow path communicating with said outflow port therein and being fixed to said casing in said float chamber, wherein said valve seat is provided on said holder so as to communicate with said flow path;

and said float comprises a float body and a lever, said valve element being provided on said lever, and one end of said lever being fixed to said float body and a secondend of said lever being supported by said holder so as to be turnable in such a manner that said valve element slides with respect to said valve seat in association with the up-and-down movement of said float body so as to be able to open and close said valve seat.

9. The float type steam trap according to claim 8, wherein said holder has a plurality of valve seats on one side;

a plurality of said valve elements are provided on said lever so as to correspond to each of said valve seats; and the second end of said lever is supported by said holder so as to be turnable in such a manner that each of said valve elements slides with respect to each of said valve seats in association with the up-and-down movement of said float body so as to be able to open and close each of said valve seats.

10. The float type steam trap according to claim 7, wherein said valve element is provided on said float so as to be turnable around an axis perpendicular to a sliding direction of said valve element, and when said valve element closes said valve seat, the turning center of said valve element and the center of an opening of said valve seat are offset from each other.

11. The float type steam trap according to claim 7, further comprising a plug member axially aligned with said valve seat.

12. The float type steam trap according to claim 8, wherein said casing is capable of being opened and closed, and said holder is fixed to said casing detachably.

* * * * *